United States
Franko-Filipasic et al.

[11] 3,990,900
[45] Nov. 9, 1976

[54] POLYMERIC PHOSPHAZENES

[75] Inventors: Borivoj Richard Franko-Filipasic, Morrisville; Edward Francis Orwoll, Langhorne, both of Pa.; John Francis Start, Mercerville, N.J.

[73] Assignee: FMC Corporation, Philadelphia, Pa.

[22] Filed: Feb. 14, 1974

[21] Appl. No.: 442,480

Related U.S. Application Data

[62] Division of Ser. No. 281,318, Aug. 17, 1972, Pat. No. 3,836,608.

[52] U.S. Cl. ............................ 106/15 FP; 106/165; 106/168; 106/177; 260/927 N
[51] Int. Cl.² ........................ C09D 5/18; C07F 9/15
[58] Field of Search ..................... 106/15 FP, 16–18, 106/168, 177, 165; 117/136, 137; 252/8.1; 260/DIG. 24, 2 P, 627 N; 161/403

[56] References Cited
UNITED STATES PATENTS

| | | | |
|---|---|---|---|
| 2,909,446 | 10/1959 | Redfarn | 117/138 |
| 3,012,908 | 12/1961 | Bilger | 106/15 FP X |
| 3,193,571 | 7/1965 | Bilger | 117/137 |
| 3,206,494 | 9/1965 | Lund et al. | 106/15 FP X |
| 3,370,020 | 2/1968 | Allcock | 260/30.4 |
| 3,505,087 | 4/1970 | Godfrey | 106/15 FP |
| 3,532,526 | 10/1970 | Godfrey | 106/15 FP X |

FOREIGN PATENTS OR APPLICATIONS

| | | | |
|---|---|---|---|
| 1,904,427 | 8/1970 | Germany | 106/15 FP |

OTHER PUBLICATIONS
B369,221, Feb. 1976, Kao, 260/927 N.

*Primary Examiner*—Theodore Morris

[57] ABSTRACT

A novel process consisting of reacting a phosphonitrilic chloride with an alcohol or alkoxide to 12 carbon atoms to produce a partially esterified phosphonitrilic chloride, removing impurities from the chloroester and heating the ester to form a condensed polymeric phosphazene with P-O-P oxygen linkages. This new class of polymer phosphazenes, with P-O-P oxygen linkages, is unusually efficacious in rendering rayon flame-retardant.

8 Claims, No Drawings

POLYMERIC PHOSPHAZENES

This is a division of application Ser. No. 281,318, filed Aug. 17, 1972, now U.S. Pat. No. 3,836,608.

This invention relates to a process for preparing polymeric phosphazenes by formation of P-O-P oxygen linkages through the condensation of alkyl esters of polymeric phosphonitrilic chlorides containing 3 to 10% residual chlorine with elimination of alkyl chloride; the polymeric phosphazene composition so obtained; and regenerated cellulose filaments and filamentary articles which are made permanently flame-retardant by having dispersed therein a flame-retardant amount of these substantially water-insoluble liquid polymeric phosphazenes.

It is desirable, for many textile purposes to provide cellulose fibers and yarns having greatly decreased flammability. In the manufacture of rayon by the viscose method, it has been proposed to add various flame-retardant chemicals to the viscose prior to spinning. This approach presents many additional problems because of the particular chemistry of the viscose process. Accordingly, the flame retardant must be stable and inert with respect to the highly alkaline viscose and also with respect to the acid regeneration bath into which the viscose is extruded. It must not be extracted during spinning and processing. Furthermore, the added material must not interfere with the spinning process, for example, cause clogging of the spinnerets.

Rayon has been made permanently flame-retardant by dispersing in the rayon a flame-retardant amount of a substantially water-insoluble, liquid phosphonitrilate polymer as disclosed by Godfrey in U.S. Pat. Nos. 3,455,713, 3,505,087 and 3,532,526, respectively, issued July 15, 1969, Apr. 7, 1970, and Oct. 6, 1970. Although the Godfrey compositions do not seriously degrade rayon fiber properties, it is always desirable to have more effective flame retardants allowing attainment of adequate flame retardance at a lower additive level with a consequent lowered impairment of physical properties of the rayon fibers and a decrease in cost.

In accordance with the present invention there is provided a novel process for producing novel liquid polymeric phosphazenes, which when dispersed in regenerated cellulose make the regenerated cellulose highly flame resistant. The phosphazene units are randomly linked together by oxygen bridges connecting phosphorus atoms of neighboring phosphazene units.

The novel process consists of partially esterifying a phosphonitrilic chloride which may consist of 100% linear polymers or of 100% cyclic polymers or any mixture of linear and cyclic polymers, with a metal alkoxide, or an alcohol in the presence of an acid acceptor, in which the alkyl portion of the alcohol or alkoxide contains 1 to 12 carbon atoms and the esterification is continued to a point where the chloroester contains 1 to 15% and preferably 3 to 10% by weight unreacted chlorine based on the weight of the chloroester. Impurities are removed from the chloroester filtering or washing, thereby removing water soluble materials, generally salts and other by-product impurities. The chloroester is heated to condense it into a polymer of increased molecular weight, by heating at a temperature between about 100° C to about 250° C, preferably, 130° C to 220°to C, removing the alkyl chloride and leaving behind the condensed polymeric product. The condensed phosphazenes of this invention are liquids, generally of pumpable viscosity. Very high viscosity materials can be diluted with solvents to facilitate incorporating the phosphazene into rayon.

The reaction of a phosphonitrilic chloride polymer with an alkoxide, or alcohol in the presence of an acid acceptor, is conventionally done by adding the phosphonitrilic chloride to a stirred slurry of the alkoxide. A stoichiometric insufficiency of the alkoxide is used to produce a chloroester containing 1 to 15% residual chlorine. The esterification is conveniently done in a solvent or diluent and the esterification reaction is generally conducted at the reflux temperature of the solvent and/or diluent selected as the reaction medium.

Ordinarily, phosphonitrilic chloride is added to a slurry of insufficient alkoxide, such as propoxide, and the esterification is completed in the usual way. The reaction proceeds in a manner so that first phosphonitrilic chloride molecules which react are completely esterified, thus, producing a mixture of completely esterified or essentially completely esterified material mixed in with unreacted polymeric phosphonitrilic chloride. However, a reverse addition process, in which the alkoxide is added to a suitable liquid phosphonitrilic chloride produces a particularly efficacious product. The reverse addition process produces more chloroester and little or no unreacted phosphonitrilic chloride is left unreacted.

The condensation of the chloroester is conveniently done by heating under vacuum to facilitate removal of by-product alkyl halides and any retained solvent or diluent utilized in the esterification reaction. Condensation of the chloroester under vacuum takes less time, there is less color build-up in the final product and residual solvent and other low boiling impurities remaining in the reaction mixture are easily removed.

In accordance with the invention a phosphonitrilic chloride polymer of the general formula:

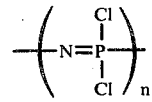

where n is at least 3, is reacted with an alcohol or alkoxide having 1 to 12 carbon atoms to produce a partially chlorinated ester which may be cyclic or linear, which for convenience is represented by the general structure:

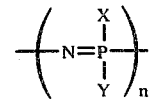

in general formula n is at least 3 and X and Y represent the same or different substituents including —OR groups wherein R is aliphatic, cycloaliphatic, aromatic or heterocyclic, the aliphatic radical being straight or branch chained and having 1 to 12 carbon atoms, preferably R is an alkyl or alkenyl radical having from 2 to 6 carbon atoms, the cycloaliphatic radicals having 4 to 6 carbon atoms and the aromatic radicals have 6 to 10 carbon atoms; R may also have substituent groups including halogens, ether or amino groups. Some of the X and Y substituents remain halogens from the phosphonitrilic halide polymer from which the ester was derived. Usually, the halogen is chlorine.

For convenience, the formulation:

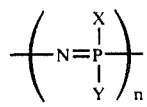

is used to denote both cyclic and linear analogs where X and Y are as defined above. It is understood that the linear analogs are more correctly formulated as:

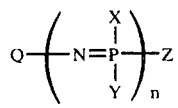

where Q and Z represent end capping groups and X and Y are as defined above. In the linear oligomers $n$ is 2 or more. For instance, Z may be —OR while Q may be

end caps, R having the meaning ascribed above. Similarly, for linear phosphonitrilic chlorides,

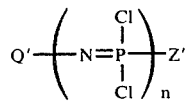

Z' may be Cl while Q' may be —$PCl_3^+ PCl_6^-$ or —$PCl_3^+ Cl^-$ or

While $n$ is generally at least 3 for linear as well as for cyclic analogs, some small proportion of the linear fraction may contain components wherein $n$ is less than 3.

The chloroester is condensed, with elimination of alkyl halide. In a simple example of the invention self condensation of a trimeric chloroester results in mixtures of products one member can be represented by the general structure:

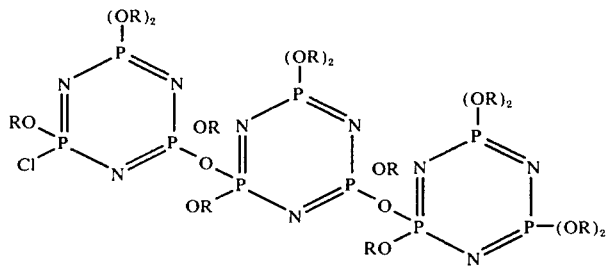

in which R is as defined above. The actual compositions are more frequently mixtures of linear and cyclic materials which include tetramers and higher cyclic polymers. Thermal alkoxyphosphazene-oxophosphazene rearrangement is known to obtain at the temperatures utilized in the present process. Some of the ester present in the products of the present process may be of the latter structure. The rearrangement is discussed by Shaw, R. A. Records of Chemical Progress, Vol. 28, 1967, pp. 243–258, "The Phosphazenes."

The reaction between the alkyl and phophorus halide groups with elimination of alkyl halide can proceed with or without solvent. The relative ratio between alkyl and phosphorus halide groups can vary widely because of the many reactant options available. In practice, reactant ratios are limited since preferred compositions retain 3 to 10% chlorine.

The reaction between the alkyl and halide groups proceeds at about 100° to about 250° C., with considerable variability in the reactivity of the halide component. The reaction may be conducted batchwise or continuously. Reaction rates are slow at the lower end of the temperature range; discoloration and competitive decomposition reactions tend to ensue at the upper end. The preferred temperature range is, therefore, 130° to 220° C.

Thermal dependence of the rate of reaction to eliminate alkyl chloride was observed in the examples for the temperature range of 150°–220° C., which examples utilized cyclic phosphonitrilic chloride to form the chloroesters. When a phosphonitrilic chloride containing 23% non-cyclic materials, linear phosphonitrilic chloride, was used to prepare the chloroester, enhancement of reaction rate in the thermal condensation reaction was observed. examination of examples 1 to 6 shows that the reaction appears to have occurred in less time than the expected time interval when using higher temperatures indicating an accelerated reaction rate due to including non-cyclic phosphonitrilic chloride in the preparation of the chloroesters. Thus, it is preferred to use as starting material polymeric phosphonitrilic chlorides containing about 10% to about 80% linear polymers, the balance of the starting material being cyclic polymers.

As the reaction between alkyl and halide groups proceeds, low boiling alkyl chloride is eliminated. Atmospheric or reduced pressure in the range of 5 to 760 mm of mercury pressure is preferred to promote removal of the alkyl chloride. Subatmospheric pressures are preferred as they limit discoloration of the product.

Depending upon choice of reactants, the condensation time varies generally from a few minutes, about 5 to 10, to 12 hours at the preferred temperature range. Condensation proceeds more rapidly at higher temperatures along with some discoloration. Optimum temperature conditions must be found for each chloroester composition. Time may be further extended if a particularly low halogen content or a higher viscosity is desired.

The reaction may be run in inert solvents (diluents) preferably chosen to reflux at the desired reaction temperature, for example, octane or chlorobenzene. A solvent from which by-product alkyl chloride is easily separated is desired. When a low-boiling solvent is chosen, pressure sufficient to achieve a desired reaction temperature is used. When the reaction is run without solvent, it is expedient to pass a slow stream of inert gas, such as $N_2$, through the reaction mixture to sweep out alkyl chloride. The extent of reaction can be monitored by measurement of alkyl chloride evolved or analysis for residual chloride.

No unusual equipment is required. A standard reactor equipped with devices for metering, agitating, heating, cooling, refluxing and distilling is applicable.

Although the reaction proceeds without catalyst, the reaction rate is materially increased by the presence of a catalyst. The use of a catalyst, such as copper, reduces time and temperature required, and decreases the extent of discoloration and decomposition reactions.

The amount of flame retardant of this invention dispersed in regenerated cellulose (rayon) depends on providing a proper balance between flame retardancy and fiber properties. Useful amounts of the flame retardant can be varied from 1 to about 25% and preferably 2 to 18% based on the weight of the filament.

The flame-retardant compounds of this invention are incorporated into regenerated cellulose filaments by any of the known methods for preparation of such filaments. While the viscose method is preferred, the flame-retardant compounds can be incorporated in cellulosic solutions, spun into filaments and the cellulose regenerated. Thus, the cuprammonium method and the desterification of a cellulose ester method can be utilized to prepare regenerated cellulose filaments having the flame-retardant compounds incorporated therein.

One embodiment of this invention comprises incorporating the above-described liquid polymeric phosphazene in a viscose solution and spinning the viscose in the shape of one or more filaments into a coagulating and regenerating medium. The formed filaments are after-treated using techniques well known in the rayon field to provide continuous filaments, fibers and yarn, as well as staple fibers. These may then be used to prepare any known textile article in which the flame-retardant property is desirable.

The following examples further illustrate the invention. All proportions in the examples and the specification are by weight unless otherwise indicated.

EXAMPLE I

A suspension of sodium propoxide was formed in 5.2 liters of mixed xylenes by charging 1140 ml of n-propanol to 308 g (13.4 moles) of agitated molten sodium at 110° to 115° C. The reaction was completed by stirring at reflux for an additional one half hour. A chloroester was prepared by charging a 19.3% stoichiometric excess (928 g, 8 moles) of cyclic phophonitrilic chloride in chlorobenzene solvent to the propoxide suspension at reflux temperatures. The chloroester formed in three hours. The chloroester was isolated by water-washing the cooled reaction mixture and concentrating the organic layer in vacuo (85°, 16 torr). The chloroester was then heated in a rotating flask at 200° C, 18 torr for 12 minutes. Analyses of precursor chloroesters (A) and thermally treated product (B) are tabulated.

| Analysis | (A) | (B) |
|---|---|---|
| Carbon | 38.03 | 37.85 |
| Hydrogen | 7.62 | 7.22 |
| Nitrogen | 8.49 | 10.12 |
| Phosphorus | 20.90 | 22.96 |
| Chlorine | 6.44 | 1.98 |
| Molecular weight | 630 | 1020 |
| Acid no. | 6.7 | 14 |
| Viscosity at 25° C. | 220cs | 2500cs |
| Refractive index at 25° C | 1.4669 | 1.4755 |

EXAMPLE II

Example I was repeated, except that thermal treatment of chloroester was carried out at 170°–180° C, 19 torr for 55 minutes. Analyses of ester before (A) and after (B) thermal treatment are tabulated.

| Analysis | (A) | (B) |
|---|---|---|
| Carbon | 38.97 | 38.02 |
| Hydrogen | 7.61 | 7.33 |
| Nitrogen | 8.61 | 9.60 |
| Phosphorus | 19.73 | 21.31 |
| Chlorine | 6.34 | 2.45 |
| Molecular weight | 640 | 1210 |
| Acid no. | 3.6 | 8.3 |
| Refractive index at 23° C | 1.4676 | 1.4745 |
| Viscosity at 25° C | 53cs | 6800cs |

EXAMPLE III

Example I was repeated except that the thermal treatment was carried out at 150°, 16 torr, for 10½ hours. Analysis of the product follows. Values in parenthesis are for untreated chloroester.

| Analysis | | |
|---|---|---|
| Carbon | 37.85 | (38.3) |
| Hydrogen | 7.30 | (7.5) |
| Nitrogen | 10.09 | (9.1) |
| Phosphorus | 22.21 | (20.67) |
| Chlorine | 0.97 | (6.57) |
| Molecular weight | 984 | 621 |
| Acid No. | 8.5 | (6.6) |
| Viscosity at 25° | 24,000cs | 80 |
| Refractive index at 29° | 1.4743 | (1.4655 at 26°) |

EXAMPLE IV

Example I was repeated except that the thermal treatment was carried out at 220°C, 15 torr, for 8 minutes. Analysis of the product follows. Values in parenthesis are for untreated chloroester.

| Analysis | | |
|---|---|---|
| Carbon | 38.46 | (40.07) |
| Hydrogen | 7.39 | (7.32) |
| Nitrogen | 9.86 | (9.06) |
| Phosphorus | 22.85 | (20.69) |
| Chlorine | 0.55 | (3.54) |
| Molecular weight | 923 | (612) |
| Acid No. | 13.4 | (14.7) |
| Viscosity at 25° | 6993cs | (44.2) |
| Refractive index at 21° | 1.4748 | (1.4645) |

The phosphorus-containing product was evaluated for its flame-retardant effect in rayon yarn produced from a filament-forming viscose comprising 8.6 wt.% cellulose, 6.2 wt.% sodium hydroxide and 33.0% carbon disulfide, based on the weight of the cellulose, and having a viscosity at spinning of 6000 centipoises at 18° C. The phosphorus-containing flame-retardant compound was injected into the viscose stream at the desired rate based on the weight of the cellulose in the viscose and the viscose mixture passed through a high shear blender. This provided viscose having the flame retardant dispersed therein as fine liquid particles of from 1 to 10 microns in size.

The viscose was spun into a conventional aqueous acid spin bath comprising 9.8 wt.% sulfuric acid, 3.0 wt.% zinc sulfate and 17.5 wt.% sodium sulfate at a bath temperature of 50° C. The yarn was wet stretched about 35% of its original length. Yarns having a denier of 240 and 40 filaments were processed by passing them through a series of baths including water wash, desulfurization, bleach, bleach acid, antichlor, and soft finish bath. The yarns were dried, transferred to packages, and finally knit into circular knit fabrics. The regenerated cellulose yarns prepared in this manner were made up of individual filaments having fine liquid flame-retardant particles locked in the cellulose matrix. The fabric retained 15% by weight of the phosphazene and the fabric was found to be flame resistant.

EXAMPLE V

The preparation of Example I was modified by using a polymeric phosphonitrilic chloride that contained 23% hexane insoluble (non-cyclic) chlorphosphazenes the balance being cyclic material. The thermal treatment was carried out at 150° C, 22 torr, for 7½ hours. Analysis of the product follows. Values in parenthesis are for untreated chloroester.

| Analysis | | |
|---|---|---|
| Carbon | 39.23 | (40.30) |
| Hydrogen | 7.83 | (8.15) |
| Nitrogen | 9.79 | (9.34) |
| Phosphorus | 21.53 | (19.75) |
| Chlorine | 1.28 | (4.89) |
| Molecular weight | 980 | (683) |
| Acid No. | 6.7 | (4.6) |
| Viscosity at 25° | 4,000cs | (320cs) |
| Refractive index at 30° | 1.4692 | (1.4626 at 28°) |

EXAMPLE VI

The preparation of Example I was modified by using a polymeric phosphonitrilic chloride that contained 64.2% hexane insoluble (non-cyclic) chlorophosphazenes. The thermal treatment was carried out at 140°–150°, 22 torr, for 65 minutes. Analysis of the product follows. Values in parenthesis are for untreated chloroester.

| Analysis | | |
|---|---|---|
| Carbon | 37.32 | (39.1) |
| Hydrogen | 7.29 | (8.03) |
| Nitrogen | 8.75 | (7.87) |
| Phosphorus | 22.15 | (20.12) |
| Chlorine | 1.64 | (5.9) |
| Molecular weight | 985 | 593 |
| Acid No. | 18.6 | (14.5) |
| Viscosity at 25° | 10,000 | 43 |
| Refractive index at 25° | 1.4715 | (1.4648 at 20°) |

What is claimed is:

1. Regenerated cellulose filaments and filamentary articles containing a flame retardant amount of a polymeric phosphazene normally liquid at room temperature and produced by a process comprising (1) reacting a phosphonitrilic chloride with a metallic alkoxide or an alkyl alcohol in the presence of an acid acceptor, the alkyl portion of the alcohol or alkoxide being a radical of 1 to 12 carbon atoms, to produce a chlorinated phosphazene ester containing 1 to 15% unreacted chlorine by weight based on the weight of the chloroester, (2) heating the chloroester for 5 minutes to 12 hours at a temperature of about 130° to about 220° C to produce a condensed polymeric phosphazene ester of increased molecular weight.

2. The product of claim 1 wherein there is present from 2 to 18% by weight of said phosphazene based on the weight of the filament.

3. The product of claim 1 in which the phosphonitrilic chloride is a mixture of linear polymers.

4. The product of claim 1 in which the phosphonitrilic chloride is a mixture of cyclic polymers.

5. The product of claim 1 in which the phosphonitrilic chloride is a mixture of cyclic and linear polymers.

6. The product of claim 1 in which the chloroester is heated at a subatmospheric pressure less than 760 mm of mercury to about 5 mm of mercury to facilitate removal of by-product alkyl chloride.

7. The product of claim 1 in which the phosphonitrilic chloride is added to the alkoxide to produce the chloroester.

8. The product of claim 1 in which the alkoxide is added to the phosphonitrilic chloride to produce the chloroester.

* * * * *